(12) United States Patent
Shelby et al.

(10) Patent No.: US 6,362,306 B1
(45) Date of Patent: Mar. 26, 2002

(54) REACTOR GRADE COPOLYESTERS FOR SHRINK FILM APPLICATIONS

(75) Inventors: Marcus David Shelby, Kingsport, TN (US); Wayne Ken Shih, Charlottesville, VA (US); Rondell Paul Little, Jr., Elizabethton, TN (US); Candace Michele Tanner; William LeRoy Wortman, both of Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/636,320

(22) Filed: Aug. 11, 2000

Related U.S. Application Data

(60) Provisional application No. 60/149,298, filed on Aug. 17, 1999.

(51) Int. Cl.$^7$ .................. C08G 63/183; C08G 63/18; B29O 55/00
(52) U.S. Cl. ................ 528/308.7; 528/307; 528/308.6; 264/175
(58) Field of Search ................ 528/307, 308.7; 264/175

(56) References Cited

U.S. PATENT DOCUMENTS

| | | | |
|---|---|---|---|
| 4,217,440 A | | 8/1980 | Barkey |
| 4,578,437 A | * | 3/1986 | Light et al. |
| 4,983,653 A | | 1/1991 | Fukuda et al. |
| 5,372,864 A | | 12/1994 | Weaver et al. |
| 5,384,377 A | | 1/1995 | Weaver et al. |
| 5,442,036 A | * | 8/1995 | Beavers et al. |
| 5,859,116 A | | 1/1999 | Shih |
| 6,068,910 A | | 5/2000 | Flynn et al. |

FOREIGN PATENT DOCUMENTS

| | | | |
|---|---|---|---|
| WO | 96/30428 | * | 10/1996 |
| WO | 99/02593 A1 | | 1/1999 |

OTHER PUBLICATIONS

Chemical Abstracts, Columbus, Ohio, XP002154652; JP 08 269307 A (Mitsubishi Chem. Corp.) Oct. 15, 1996.*
Chemical Abstracts, Columbus, Ohio, XP002154653; JP 2000 195765 a (Toray Ind.), Jul. 14, 2000.*
Derwent Publications Ltd., London, GB; XP002154661; JP 07 001583 A (Toyobo KK), Jan. 6, 1995.*
Chemical Abstracts, Columbus, OH, XP002154654; JP 03 143619 A (Toyobo Co., Ltd.), Jun. 19, 1991.*
Chemical Abstracts, Columbus, OH, XP002154655; JP 03 142224 A (Toyobo Co., Ltd.), Jun. 18, 1991.*
Chemical Abstracts, Columbus, OH, XP002154656; JP 05 245930 A (Sekisui Chemical Co.), Sep. 24, 1993.*
Chemical Abstracts, Columbus, OH, XP02154657; JP 07 032478 A (Toyo Boseki), Feb. 3, 1995.*
Chemical Abstracts, Columbus, OH, XP002154658; JP 07 205283 A (Toyo Boseki), Aug. 8, 1995.*
Chemical Abstracts, Columbus, OH, XP002154659; JP 08 027258 A (Mitsui Petrochemical Ind.), Jan. 30, 1996.*
Chemical Abstracts, Columbus, OH, XP002154660; JP 06 179742 A (Toray Ind.), Jun. 28, 1994.*

* cited by examiner

*Primary Examiner*—Tae H. Yoon
(74) *Attorney, Agent, or Firm*—Cheryl J. Tubach; Bernard J. Graves, Jr.

(57) ABSTRACT

A reactor grade copolyester composition, as well as a heat-shrinkable film made therefrom, unexpectedly has higher ductility than a multi-component blend of copolyesters with the same monomer concentrations. The reactor grade copolyester composition is made from a diacid component of at least about 90 mole percent and a diol component of (a) about 72 to about 88 mole percent ethylene glycol, about 10 to about 15 mole percent 1,4-cyclohexanedimethanol, and about 2 to about 13 mole percent diethylene glycol, or (b) about 59 to about 77.5 mole percent ethylene glycol, about 15 to about 28 mole percent 1,4-cyclohexane-dimethanol, and about 7.5 to about 13 mole percent diethylene glycol. Further, the heat-shrinkable film may be produced to closely match the shrink characteristics of polyvinyl chloride by varying the amounts of the diol components of the reactor grade copolyester composition. Furthermore, a reactor grade copolyester composition has a b* color value of −1.0 to less than 4.5, wherein the diacid component is at least about 90 mole percent terephthalic acid and the diol component is about 52 to about 88 mole percent ethylene glycol, about 10 to about 28 mole percent 1,4-cyclohexane-dimethanol, and about 2 to about 20 mole percent diethylene glycol.

21 Claims, 6 Drawing Sheets

REACTOR GRADE COPOLYESTERS FOR SHRINK FILM APPLICATIONS

CROSS-REFERENCE TO RELATED APPLICATIONS

This application claims the benefit of U.S. provisional application Serial No. 60/149,298 filed Aug. 17, 1999.

TECHNICAL FIELD

This invention relates to heat-shrinkable plastic films, and more particularly, to reactor grade copolyester compositions useful as materials to make heat-shrinkable plastic films.

BACKGROUND OF THE INVENTION

Heat-shrinkable plastic films are used as coverings, to hold objects together, and as an outer wrapping for bottles, cans and other kinds of containers. For example, such films are used for covering the cap, neck, shoulder or bulge of bottles or the entire bottle; for the purpose of labeling, protection, parceling, or increasing the value of the product; and for other reasons. In addition, such films may be used as a covering to package such objects as boxes, bottles, boards, rods, or notebooks together in groups, and such films may also be attached closely as a wrapping. The uses mentioned above take advantage of the shrinkability and the internal shrink stress of the film.

Poly(vinyl chloride) (PVC) films dominate the shrink film market. However, polyester films have become a significant alternative because polyester films do not possess the environmental problems associated with PVC films. Polyester shrink films ideally would have properties very similar to PVC films so that the polyester can serve as a "drop-in" replacement on existing shrink tunnel equipment. PVC film properties that are desired for duplication include the following: (1) a relatively low shrinkage onset temperature, (2) a total shrinkage which increases gradually and in a controlled manner with increasing temperature, (3) a low shrink force to prevent crushing of the underlying container, (4) a high total shrinkage (for example, 50% or greater) and (5) an inherent film toughness so as to prevent unnecessary tearing and splitting of the film prior to and after shrinkage.

In U.S. Pat. No. 5,859,116 (the '116 patent), a heat-shrinkable polyester film is made from a copolyester blend of 1 to 98.5 weight percent 1,4-cyclohexanedimethanol modified poly(ethylene terephthalate) (PETG copolyester), 98.5 to 1 weight diethylene glycol modified poly(ethylene terephthalate) (DEG modified PET copolyester) having a b* value of less than 15, 0.5 to 3 weight percent anti-blocking agent, and optionally, 5 to 15 weight percent crystallizable polyester, such as poly(ethylene terephthalate) (PET). The PETG copolyester has a dicarboxylic acid component of at least 95 mole percent terephthalic acid (TA) and a diol component of 65 to 80 mole percent ethylene glycol (EG) and 35 to 20 mole percent 1,4-cyclohexanedimethanol (CHDM). The DEG modified PET copolyester has a dicarboxylic acid component of at least 75 mole percent terephthalic acid and a diol component of 10 to 50 mole percent diethylene glycol (DEG) and 50 to 90 mole percent ethylene glycol. By varying the amount of diethylene glycol content in these copolyester blends, heat shrinkable films made therefrom can be produced with desired shrinkage characteristics, such as low-onset temperature similar to polyvinyl chloride (PVC). The use of the DEG modified PET copolyester having improved clarity also results in shrink films that are free of haze with a b* color value of 0.9 to 1.10.

While the shrink films of the '116 patent provide many benefits over the prior art, some significant disadvantages are associated with the use of these blends of copolyesters. The blend formulation may contain up to four components, which include PETG copolyester, DEG modified PET copolyester, PET and an anti-blocking agent. Multiple component blends make processes during production for drying, weighing, blending, and extruding more complicated and labor intensive with each additional component. For example, the PETG copolyester needs to be dried at 150° F., the PET at 300° F., and the DEG modified copolyester at 110° F. Thus, three dryers are required to produce the blend. In addition, a precise blending of all materials is critical in controlling the quality of the film since variations in composition affect the properties. The blending of amorphous polymers, such as PETG copolyester and DEG modified PET copolyester, with a crystalline polymer, such as PET, may also create problems in extrusion because the materials have different melt properties. The mismatch in melting can cause mixing inconsistency in extrusion. In addition, blending, material separation, inventory, and storage of the many materials can be tedious.

Thus, there exists a need in the art for a polyester material capable of use as a shrink film material that eliminates excessive handling requirements, makes drying more efficient, and produces a more consistent product. Accordingly, it is to the provision of such material that the present invention is primarily directed.

SUMMARY OF THE INVENTION

A reactor grade copolyester composition unexpectedly has a higher ductility as compared to a blend formulation, as disclosed in U.S. Pat. No. 5,859,116 (the '116 patent), of a PETG copolyester and a DEG modified PET copolyester, both having the same mole percentages of monomers. The reactor grade copolyester composition and a shrink film made therefrom comprise a diacid component comprising residues of at least about 90 mole percent terephthalic acid and a diol component that is one of two compositions. Diol component (a) comprises residues of about 72 to about 88 mole percent ethylene glycol, about 10 to about 15 mole percent 1,4-cyclohexane-dimethanol, and about 2 to about 13 mole percent diethylene glycol. Diol component (b) comprises residues of about 59 to about 77.5 mole percent ethylene glycol, about 15 to about 28 mole percent 1,4-cyclohexanedimethanol, and about 7.5 to about 13 mole percent diethylene glycol. The diacid component and the diol component are each based on 100 mole percent.

In another embodiment, a heat-shrinkable film prepared from a reactor grade copolyester composition has a shrink curve almost identical to that of PVC film. The diacid component of the reactor grade copolyester composition comprises residues of at least about 90 mole percent terephthalic acid. The diol component of the reactor grade copolyester composition comprises residues of about 61 to about 82 mole percent ethylene glycol, about 16 to about 26 mole percent 1,4-cyclohexane-dimethanol, and about 2 to about 13 mole percent diethylene glycol within +/−2.5 mole percent of the formula:

$$\% \text{ DEG(optimum)} = 63 - 4.26*(\% \text{ CHDM}) + 0.0822*\text{CHDM}^2.$$

In still another embodiment, a reactor grade copolyester composition comprises a diacid component comprising residues of at least about 90 mole percent terephthalic acid and a diol component comprising residues of about 52 to about 88 mole percent ethylene glycol, about 10 to about 28 mole percent 1,4-cyclohexanedimethanol, and about 2 to about 20 mole percent diethylene glycol, based on 100 mole percent diacid component and 100 mole percent diol component. The copolyester composition has a b* color value of −1.0 to less than 4.5, which is an unexpected, significant improvement over the b* color value of the blend formulations of the '116 patent.

DETAILED DESCRIPTION

The present invention is a reactor grade copolyester composition and heat-shrinkable films made therefrom. The term "reactor grade" means a product that is prepared directly from esterification/transesterification of certain diacid/diester monomers and diol monomers followed by polycondensation. The preparation of the reactor grade copolyester composition is contrary to the preparation of a copolyester blend formulation, which is a physical blending of more than one polyester or copolyester composition in an extruder to obtain a desired material. The reactor grade copolyester composition (herein referred to as "rxn-copolyester") unexpectedly has superior performance properties and other advantages as a single-component material for use in making conventional films and shrink films as compared with the multiple-component copolyester blend formulations of the '116 patent (hereinafter "the '116 blends"), both having the same final copolyester composition.

In one embodiment of the present invention, the rxn-copolyester is unexpectedly more ductile than copolyesters made from the '116 blends, both having the same monomer concentrations. Thus, a film made from the rxn-copolyester is less likely to tear during printing and web handling than film made from the '116 blends. As shown in Examples 3 to 5 and FIGS. 3 and 4, the oriented films of the rxn-copolyesters and the '116 bends transition from ductile to brittle as the level of DEG increases. Brittleness is not a desired property as it causes tearing of the films in the non-oriented direction. This ductile-brittle transition occurs for the rxn-copolyesters at a much higher level of DEG (about 13 mole percent) compared with the '116 blends (about 7.5 mole percent). Thus, since the rxn-copolyester can incorporate more DEG without loss of ductility, there is more flexibility in modifying the shrink window of the rxn-copolyester. The rxn-copolyester comprises a diacid component comprising residues of at least about 90 mole percent terephthalic acid and a diol component comprising residues of either one of the following: (a) about 72 to about 88 mole percent ethylene glycol, about 10 to about 15 mole percent 1,4-cyclohexanedimethanol, and about 2 to about 13 mole percent diethylene glycol, or (b) about 59 to about 77.5 mole percent ethylene glycol, about 15 to about 28 mole percent 1,4-cyclohexanedimethanol, and about 7.5 to about 13 mole percent diethylene glycol. The diacid component and the diol component are each based on 100 mole percent. As a measure of ductility, the rxn-copolyester preferably has an elongation at break in a non-stretch direction as measured according to ASTM D882 for a nominally 2 mil (50 microns) thick film of at least about 300 percent, and more preferably at least about 400 percent.

Figure 2:
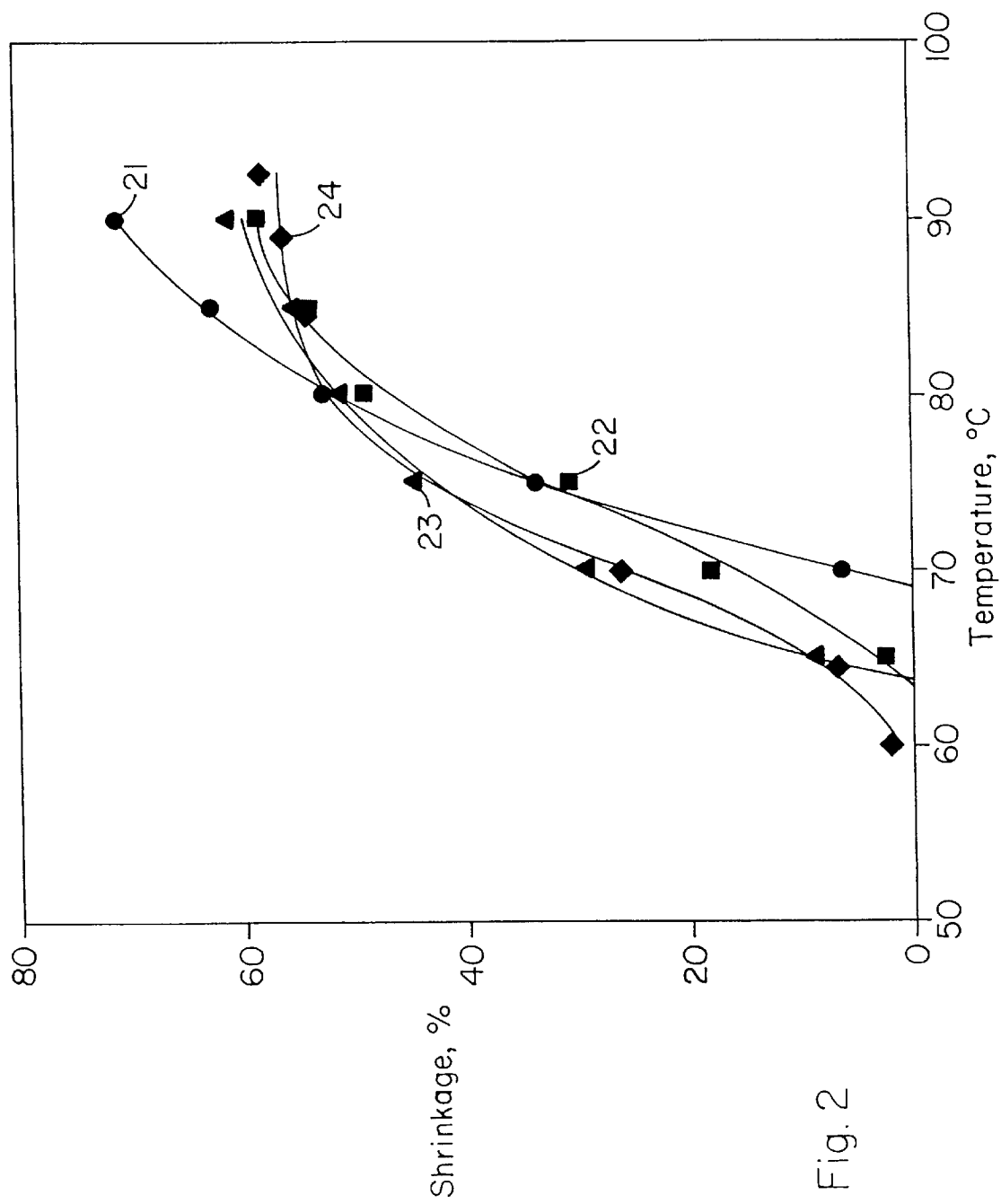
FIG. 2 is a graph showing shrinkage curves of 2 mil (50 microns) films of reactor grade copolyester compositions of the present invention compared with prior art polymers.
Figure 5:
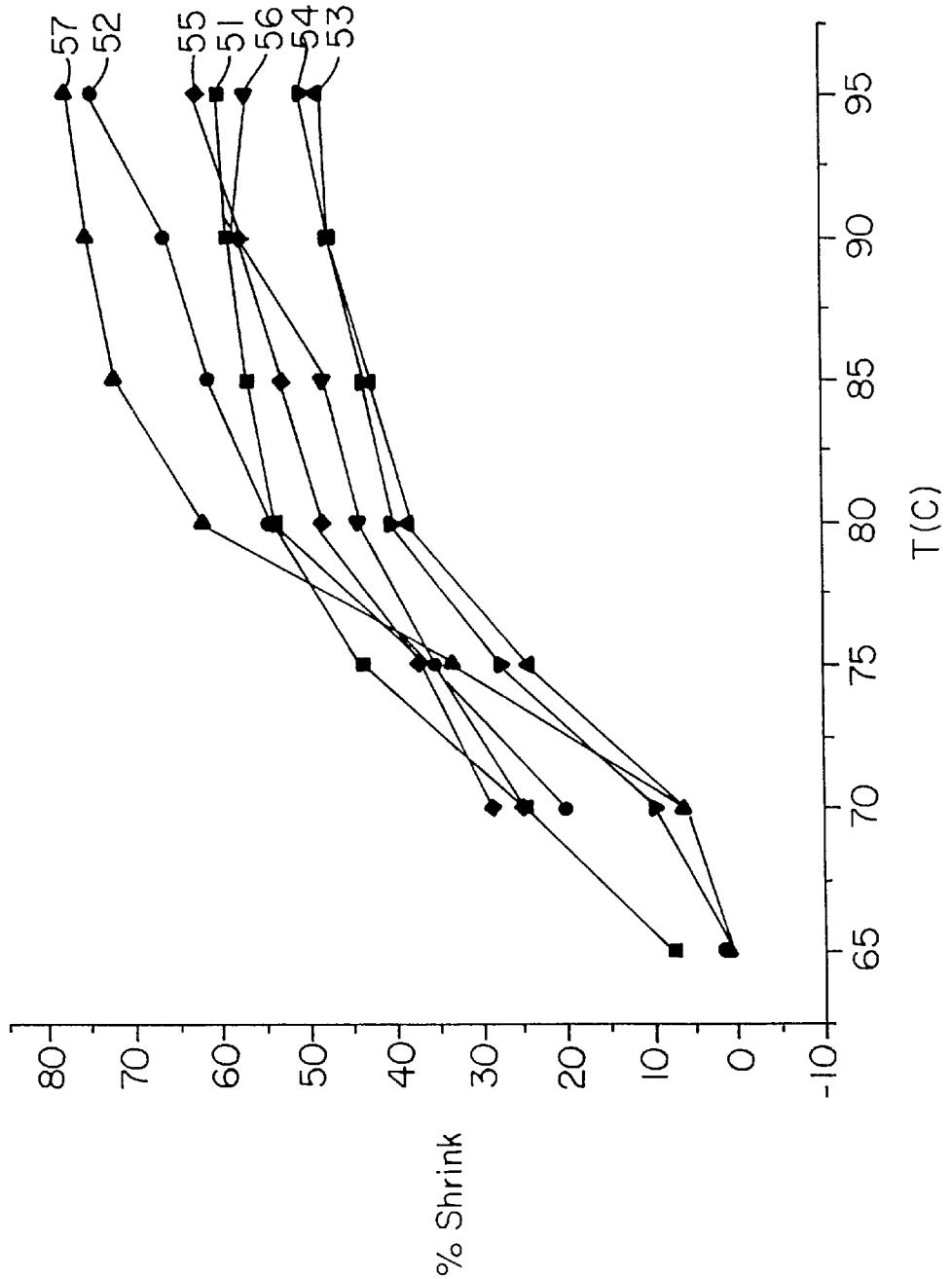
FIG. 5 is a graph showing free shrinkage after 30 seconds as a function of temperature for reactor grade copolyester compositions of the present invention compared with prior art polymers.
Figure 6:
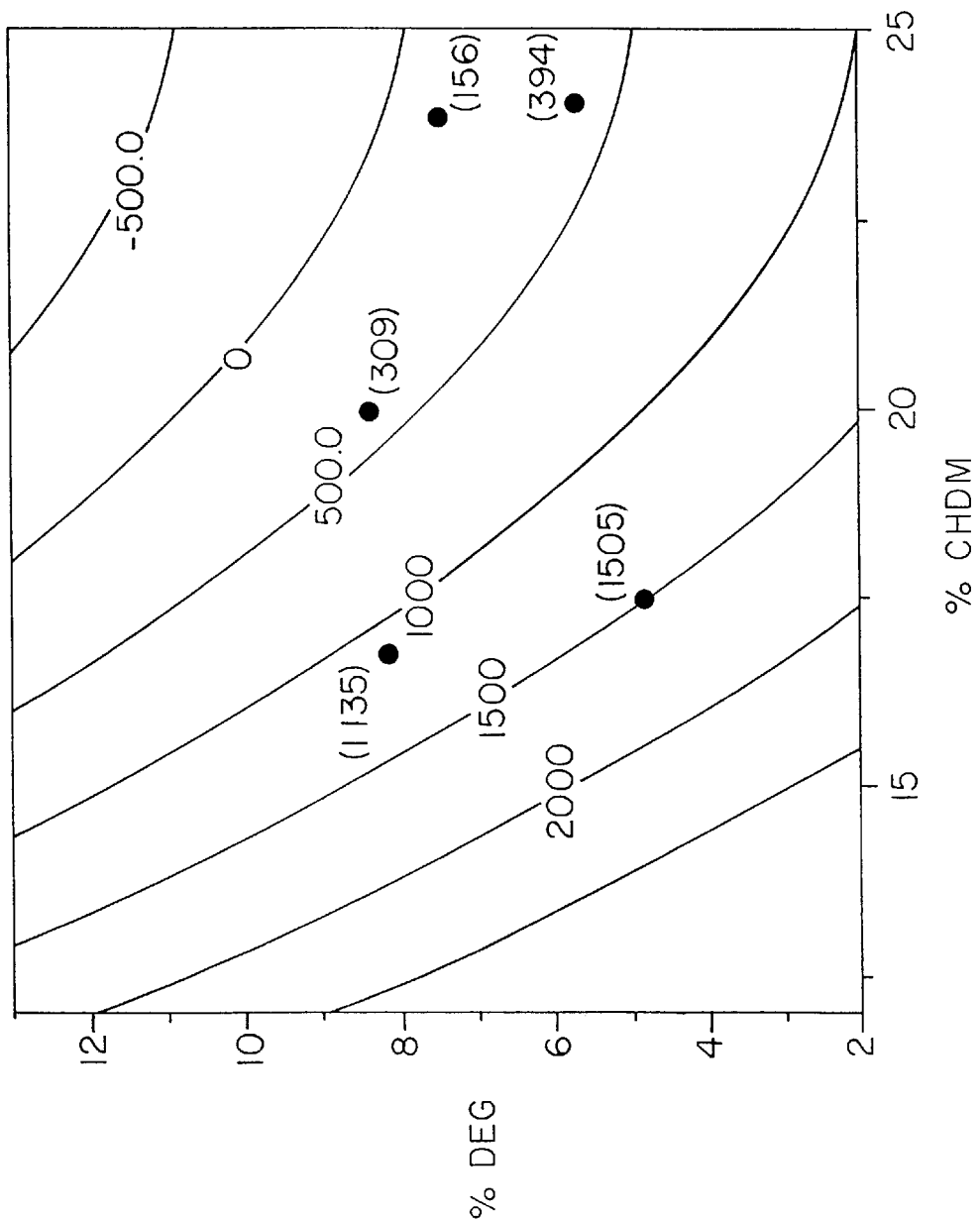
FIG. 6 is a contourplot of the sum of squares shrink error for reactor grade copolyester compositions of the present invention as compared with the PVC shrink curve.

Further, as shown in Examples 2 and 6 and FIGS. 2, 5 and 6 the shrinkage properties of films made from the rxn-copolyester are preferably matched to the shrinkage properties of PVC film. In such a preferred embodiment, the diol component (b) of the rxn-copolyester comprises 16 to 26 mole percent 1,4-cyclohexanedimethanol. More preferably, in conjunction with the preferred mole percentages of 1,4-cyclohexanedimethanol the residues of diethylene glycol are present within +/−2.5 mole percent according to the following formula:

$$\% \text{ DEG(optimum)}=63-4.26*(\% \text{ CHDM})+0.0822*\text{CHDM}^2.$$

In another embodiment of the present invention, a heat-shrinkable film comprises a rxn-copolyester comprising a diacid component comprising residues of at least about 90 mole percent terephthalic acid and a diol component comprising residues of about 61 to about 82 mole percent ethylene glycol, about 16 to about 26 mole percent 1,4-cyclohexanedimethanol, and about 2 to about 13 mole percent diethylene glycol within +/−2.5 mole percent of the formula:

$$\% \text{ DEG(optimum)}=63-4.26*(\% \text{ CHDM})+0.0822*\text{CHDM}^2.$$

This embodiment of the present invention provides a heat-shrinkable film that has a shrink curve almost identical to that of PVC film. Preferably, the heat-shrinkable film has a higher ductility as compared to the heatshrinkable films of the '116 blends. The diol component of such a heat-shrinkable film comprises residues of about 7.5 to about 13 mole percent diethylene glycol.

With reference to FIGS. 2 and 6, comparisons are made between EASTAR PETG Copolyester 6763, the rxn-copolyester of the present invention, the '116 blends and PVC. Of course, each of these materials may be used as shrink film. In most applications, a low onset shrink temperature is desired to prevent damage to whatever article is being packaged. Also a certain level of shrinkage is required depending on the package, but usually this is a minimum of 50% in the hoop direction, i.e. around the package. The data shows that the rxn-copolyester is a much improved shrink polymer as compared to (a) EASTAR PETG Copolyester 6763 by reducing the on-set temperature, shrinkage at 90° C. and shrink rate (slope of the shrink curve); (b) the '116 blends by reducing the complexity of the manufacturing process and broadening the ductility range of the shrink film; and (c) PVC by removing environmental barriers and providing an equivalent material. All these improvements contribute to the user-friendliness of the shrink film made from the rxn-copolyester in a shrink tunnel. The low shrink rate will prevent wrinkle or bubble formation in shrink tunnels. The finish of the label hence will be greatly improved. In addition, the rxn-copolyester can be tailored to maintain shrinkage at higher temperatures, which is critical in labeling the entire contour bottle with wide body and narrow neck. The shrinkage of PVC film levels off beyond 90° C. which prevents the label from tightly covering the narrow neck of a contour bottle.

In another embodiment of the invention, the rxn-copolyester comprises a diacid component comprising residues of at least about 90 mole percent terephthalic acid (TA) and a diol component comprising residues of about 52 to about 88 mole percent ethylene glycol (EG), about 10 to about 28 mole percent 1,4-cyclohexanedimethanol (CHDM), and about 2 to about 20 mole percent diethylene glycol (DEG). The mole percentages are based on 100 mole percent of the diacid component and 100 mole percent of the diol component. The rxn-copolyester has a b* color value of −1.0 to less than 4.5. Preferably, the b* color value is −1.0 to 3.5.

The rxn-copolyester contains DEG, and usually copolyesters containing DEG will give higher b* color values than copolyesters not containing DEG. For example, EASTAR PETG Copolyester 6763 containing no DEG and EASTOBOND Copolyester 19411 containing DEG have b* color values of about 4.5 and 9.5, respectively. Both materials are available from Eastman Chemical Company of Kingsport, Tenn. and utilized in the blend examples of the '116 patent. The '116 blends have a b* color value of at least 4.5. Thus, the b* color value of the present invention is unexpected when comparing the single component copolyester with the '116 blends, both having the same content of DEG.

The improved clarity measured by the lower b* color values is attributed to the process for manufacturing the rxn-copolyester, which includes utilizing a catalyst system of 10 to 100 ppm titanium, 0 to 75 ppm manganese and 25 to 150 ppm phosphorus and an organic toner system of 1.0 to 10.0 ppm red compound of anthraquinones and 1.0 to 10.0 ppm blue compound of substituted 1,4-bis(2,6-dialylanilino) anthraquinones. Preferably, the ranges for the catalyst system are 15 to 50 ppm titanium, 20 to 60 ppm manganese and 30 to 70 ppm phosphorus and an organic toner system of 1.0 to 5.0 ppm red compound of anthraquinones and 1.0 to 5.0 ppm blue compound of substituted 1,4-bis(2,6-dialylanilino) anthraquinones. The combination of the red and blue compounds as organic toners is described in U.S. Pat. Nos. 5,372,864 and 5,384,377, which are herein incorporated by reference.

The titanium is preferably added as titanium tetraalkoxide, e.g., titanium tetraisopropoxide, titanium tetraethoxide or titanium tetrabutoxide. The manganese is preferably used as a salt. Examples of suitable manganese salts are manganous benzoate tetrahydrate, manganese oxide, manganese acetate, manganese acetylacetonate, manganese succinate, manganese glycolate, manganese naphthalate and manganese salicyl salicylate. The phosphorus is preferably added as a phosphate ester such as trialkyl phosphate and triphenyl phosphate or as phosphoric acid.

For all of the above embodiments of the present invention, the following general statements apply with respect to the rxn-copolyester and films made therefrom. The use of the corresponding acid anhydrides, esters, and acid chlorides of the diacids is included in the term "diacid". For monomers which exist in isomeric form, i.e. cis-1,4-cyclohexanedimethanol and trans-1,4-cyclohexanedimethanol, the isomers are included in the use of any general expression of the monomer.

The diacid component in the rxn-copolyester preferably comprises at least 95 mole percent, more preferably 100 mole percent, terephthalic acid. The diacid component may be modified by other diacids in amounts of up to 10 mole percent. Suitable modifying diacids include saturated aliphatic dicarboxylic acids having 4 to 12 carbon atoms and cycloaliphatic dicarboxylic acids having 8 to 12 carbon atoms. Specific examples of dicarboxylic acids are: phthalic acid, isophthalic acid, 2,6-naphthalenedicarboxylic acid, 1,4-cyclohexanedicarboxylic acid, cyclohexanediacetic acid, diphenyl4,4'-dicarboxylic acid, succinic acid, glutaric acid, adipic acid, azelaic acid, sebacic acid, and the like.

The diol component of the rxn-copolyester may optionally be modified with up to 10 mole percent of one or more different diols. Such additional diols include cycloaliphatic diols having 6 to 15 carbon atoms and aliphatic diols having 3 to 8 carbon atoms. Examples of such diols include triethylene glycol, propane-1,3-diol, butane-1,4-diol, 2,2-dimethylpropane-1,3-diol (neopentyl glycol), pentane-1,5-diol, hexane-1,6-diol, 3-methyl-pentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-etramethyl-cyclobutane, 2,2-bis-(3-hydroxyethoxyphenyl)-propane, 2,2-bis-(4-hydroxypropoxyphenyl)-propane, and the like.

The rxn-copolyester may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

The rxn-copolyester has an inherent viscosity (IV) of 0.4 to 1.5 dL/g, preferably 0.6 to 0.9 dL/g as measured at 25° C. using 0.50 grams of polymer per 100 ml of a solvent consisting of 60% by weight phenol and 40% by weight tetrachloroethane.

The rxn-copolyesters may be prepared by conventional polycondensation procedures well-known in the art. Such processes include direct condensation of the diacid(s) with the diol(s) or by ester interchange using a dialkyl dicarboxylate. For example, a dialkyl terephthalate such as dimethyl terephthalate is ester interchanged with the diol(s) at elevated temperatures in the presence of a catalyst.

The rxn-copolyesters are formed into films by the well-known method of extrusion. Pellets of the rxn-copolyester are placed in an extruder for melting and upon exiting the extruder the rxn-copolyester melt is shaped into a film. The shape of the film is not restricted in any way. For example, it may be a flat sheet or a tube. The film obtained may be stretched, for example, in a certain direction by from 2 to 6 times the original measurements. Alternatively, the rxn-copolyesters may be formed into a film by calendering as disclosed in U.S. Pat. No. 6,068,910 to Flynn et al. Of course, other conventional methods of film formation may be used as well.

The stretching of the films may be by any usual method such as the roll stretching method, the long-gap stretching method, the tenter-stretching method, and the tubular stretching method. With use of any of these methods, it is possible to conduct biaxial stretching in succession, simultaneous biaxial stretching, uni-axial stretching, or a combination of these. With the biaxial stretching mentioned above, stretching in the machine direction and transverse direction may be done at the same time. Also the stretching may be done first in one direction and then in the other direction to result in effective biaxial stretching. Preferably, stretching of the film is done by preliminarily heating the film at a temperature in the range of a mean glass transition temperature ($T_g$) of the rxn-copolyester composition to $T_g+5°$ C. to $T_g+80°$ C., preferably $T_g+10°$ C. to $T_g+20°$ C. Preferably the stretch rate is 5 to 20 inches (12.7 to 50.8 cm) per second. Stretch ratio is defined as the draw ratio in the x-axis direction to the draw ratio in the y-axis direction. The draw ratio is the final length of the film divided by the original length of the film.

Thus, the present invention provides a reactor grade copolyester composition and film made therefrom which has superior performance properties over the '116 blends, in particular a higher ductility which reduces tear and a shrink curve that more closely matches that of competitive PVC shrink films. Further, the rxn-copolyester being a single-component material as opposed to the multi-component blends of the '116 patent reduces raw material and capital costs in heat-shrinkable film production by eliminating tedious material handling, increasing drying efficiency, improving batch-to-batch consistency.

This invention can be further illustrated by the following examples of preferred embodiments thereof, although it will be understood that these examples are included merely for purposes of illustration and are not intended to limit the scope of the invention unless otherwise specifically indicated.

EXAMPLES
Example 1
Composition of Rxn-copolvester

Rxn-copolyesters were produced with varying mole percentages of DEG and CHDM to determine the effect on shrinkage. Preparation of these resins followed standard manufacturing procedures for making polyesters already well known in the art. The rxn-copolyester compositions are as set forth in Table 1.

Figure 1:
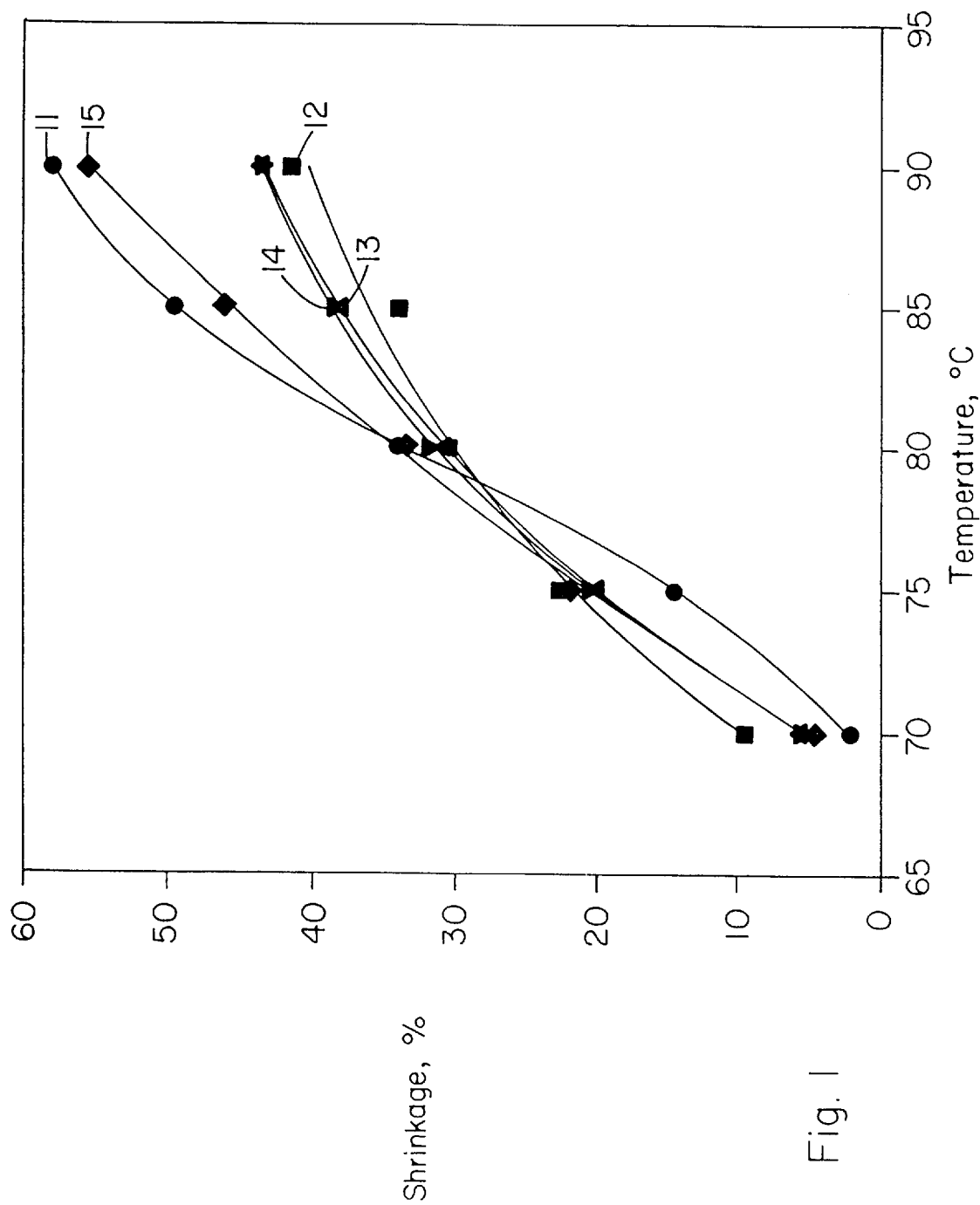
FIG. 1 is a graph showing the change in the shrinkage curve of 3 mil (75 microns) films of reactor grade copolyester compositions of the present invention with varying amount of 1,4-cyclohexanedimethanol, diethylene glycol and ethylene glycol.

As shown in FIG. 1, adjustment in the composition of the rxn-copolyester enables one to have a shrink film with varying properties. The different curves represent the percent shrinkage of the rxn-copolyester with different compositions. The percent shrinkage at 90° C. of a 3 mil (75 microns) film decreased with decreasing CHDM. The on-set shrink temperature decreased with increasing DEG.

TABLE 1

| Ref. # | TA | CHDM | DEG | EG |
|---|---|---|---|---|
| 11 | 100 | 31 | 0 | 69 |
| 15 | 100 | 27 | 5 | 68 |
| 14 | 100 | 23 | 7 | 70 |
| 13 | 100 | 22 | 8 | 70 |
| 12 | 100 | 20 | 9 | 71 |

Example 2
Property Comparison

In this Example 2, a rxn-copolyester was prepared to mimic a multi-component blend formulation of 80 mole percent PETG copolyester and 20 mole percent DEG modified PET. The 80/20 blend was prepared using EASTAR PETG Copolyester 6763, which is an amorphous copolyester containing only minimal DEG (ca. 2 mole percent) and 31 mole percent of CHDM, and EASTOBOND Copolyester 19411, which has no CHDM and has 37 mole percent of DEG. Both materials were available from Eastman Chemical Company of Kingsport, Tenn. Thus, the rxn-copolyester and the 80/20 blend both contained 100 mole percent residues of terephthalic acid, 25 mole percent 1,4-cyclohexanedimethanol, 7 mole percent diethylene glycol and 68 mole percent ethylene glycol.

The performance characteristics of the rxn-copolyester and the 80/20 blend were expected to be substantially similar since the final film compositions were identical. However, such was not the case as shown in the Table 2 and FIG. 2. For example, the glass transition temperature ($T_g$) of the rxn-copolyester was 77° C. as compared to 73° C. for the 80/20 blend and was 4° C. lower than that of the PETG copolyester. The onset shrink temperature (the temperature where the shrinkage is about 5%) of the rxn-copolyester as compared to the 80/20 blend had a similar trend as well. The shrinkage at 90° C. of the rxn-copolyester was 10% below the PETG copolyester and almost equivalent to that of the 80/20 blend.

TABLE 2

| Ref. # | Material | $T_g$, ° C. | On-set ° C. | Shrinkage @90° C., % |
|---|---|---|---|---|
| 21 | PETG copolyester | 81 | 69 | 71 |
| 22 | Rxn-copolyester | 77 | 65 | 59 |
| 23 | 80/20 Blend | 73 | 63 | 61 |
| 24 | PVC | 70 | 60 | 56 |

Example 3
Rxn-Copolvester Optimum Compositions

Rxn-copolyesters were produced with varying mole percentages of DEG and CHDM in order to determine the optimum composition. These formulations are listed in Table 3. The target IV of the resins was approximately 0.76 dL/g, as measured at 25° C. using 0.50 grams of polymer per 100 ml of a solvent consisting of 60% by weight phenol and 40% by weight tetrachloroethane. Preparation of these resins followed standard manufacturing procedures for making polyesters already well known in the art.

A portion of these resins were dried and extruded into film at a nominal temperature of 500° F. (260° C.) on either a 1.5" (3.8 cm) Killion extruder or a 2.5" (6.4 cm) Davis Standard extruder with a thickness of 9 mils (0.23 mm). Following this, part of the film was stretched to approximately 4×1 stretch ratio at 195° F. (90° C.) using a T. M. Long Film stretcher. The other portion of the resin was run on a commercial tenter line and stretched at approximately the same conditions.

TABLE 3

| Sample # | % DEG | % CHDM | % EOB (MD) |
|---|---|---|---|
| 1a | 5.7 | 24 | 461 (+/− 24) |
| 2a | 4.8 | 17.4 | 466 (+/− 20) |
| 3a | 8.2 | 16.7 | 471.6 (+/− 12) |
| 4a | 7.5 | 23.8 | 469 (+/− 12) |
| 5a | 8.4 | 19.9 | 474 (+/− 19) |
| 6a | 21 | 31 | 3.3 (+/− 0.1) |
| 7a | 14 | 31 | 182 (+/− 51) |
| 8a | 9 | 31 | 370 (+/− 11) |
| 9a | 15 | 15 | 4.7 (+/− 4) |
| 10a | 25 | 15 | 66.3 (+/− 48) |
| 11a | 9 | 20 | 467 (+/− 21) |
| 12a | 2 | 31 | 446 (+/− 3) |

Example 4
Blend Formulations

For comparative purposes, EASTAR PETG Copolyester 6763, EASTOBOND Copolyester 19411 and EASTAPAK PET Polyester 7352 (a poly(ethylene terephthalate)) were pellet-pellet blended to produce the same CHDM and DEG levels as in the rxn-copolyesters of Table 3, and then extruded into film. By blending these resins at the appropriate levels, almost all of the compositions in Table 3 were matched. These are listed in Table 4. Other than the difference in resin preparation, extrusion and stretching of the blends followed exactly with that of the rxn-copolyesters in Example 3. The blends represent the prior art set forth in the '116 patent.

TABLE 4

Blend Formulations

| Sample # | % DEG | % CHDM | % EOB (MD) |
|---|---|---|---|
| 1b | 5.7 | 24 | 381 (+/− 210) |
| 2b | 4.8 | 17.4 | 485 (+/− 16) |
| 3b | 8.2 | 16.7 | 3.7 (+/− 0.2) |
| 4b | 7.5 | 23.8 | 469 (+/− 11) |
| 5b | 8.4 | 19.9 | 178 (+/− 239) |
| 6b | 11 | 12 | 3.0 (+/− 0.2) |
| 7b | 6.5 | 21 | 387 (+/− 214) |
| 8b | 7 | 20 | 346 (+/− 219) |
| 9b | 8.5 | 12 | 4.2 (+/− 0.4) |
| 10b | 7 | 12 | 133 (+/− 279) |
| 11b | 5.5 | 12 | 54 (+/− 110) |
| 12b | 15 | 15 | 4.7 (+/− 3.8) |
| 13b | 9 | 20 | 241 (+/− 233) |

Example 5
Tensile Property and Ductility Comparison

Samples of the resins in Table 3 and 4 were stretched 4×1 at 195° F. (90° C.) using a T. M. Long film stretcher. This stretch condition closely simulated the orientation in a commercial tenter frame. These stretched samples were then tensile tested in both the stretch (TD) and non-stretch (MD) directions following ASTM D882 guidelines. Elongation at break (EOB) in each of the directions was tested as a quantitative measure of the ductility of the film. Low values (ca. 5 to 10%) indicate brittle films that will likely tear easily during handling. In contrast, higher values (ca. 300% or higher) usually indicate films with sufficient ductility to withstand handling and shrinkage around containers without failure.

A comparison of the EOB values in the stretch (TD) indicated no major differences between the blends and rxn-copolyesters with all values being between 50 and 80%. In contrast, in the weaker, non-stretch direction, the EOB's were generally higher (>400%) although the samples tended to get more brittle (lower EOB) as the DEG level increased for both the blends and rxn-copolyesters. It is well known in the art that DEG can cause film brittleness. However, DEG is needed in order to lower the shrinkage onset temperature.

Film brittleness was an important characteristic as it indicated the propensity of a film to tear and was utilized to compare properties of the blends versus the rxn-copolyesters. Unexpectedly, there was a difference in EOB between the blends and rxn-copolyesters. Comparing rxn-copolyester 3a with blend 3b (same composition), the blend had only about 3% EOB whereas the rxn-copolyester had 471% EOB. Similarly, a comparison of samples 5a and 5b show that the blend EOB was much lower than the rxn-copolyester (178% vs. 474%).

Figure 3:
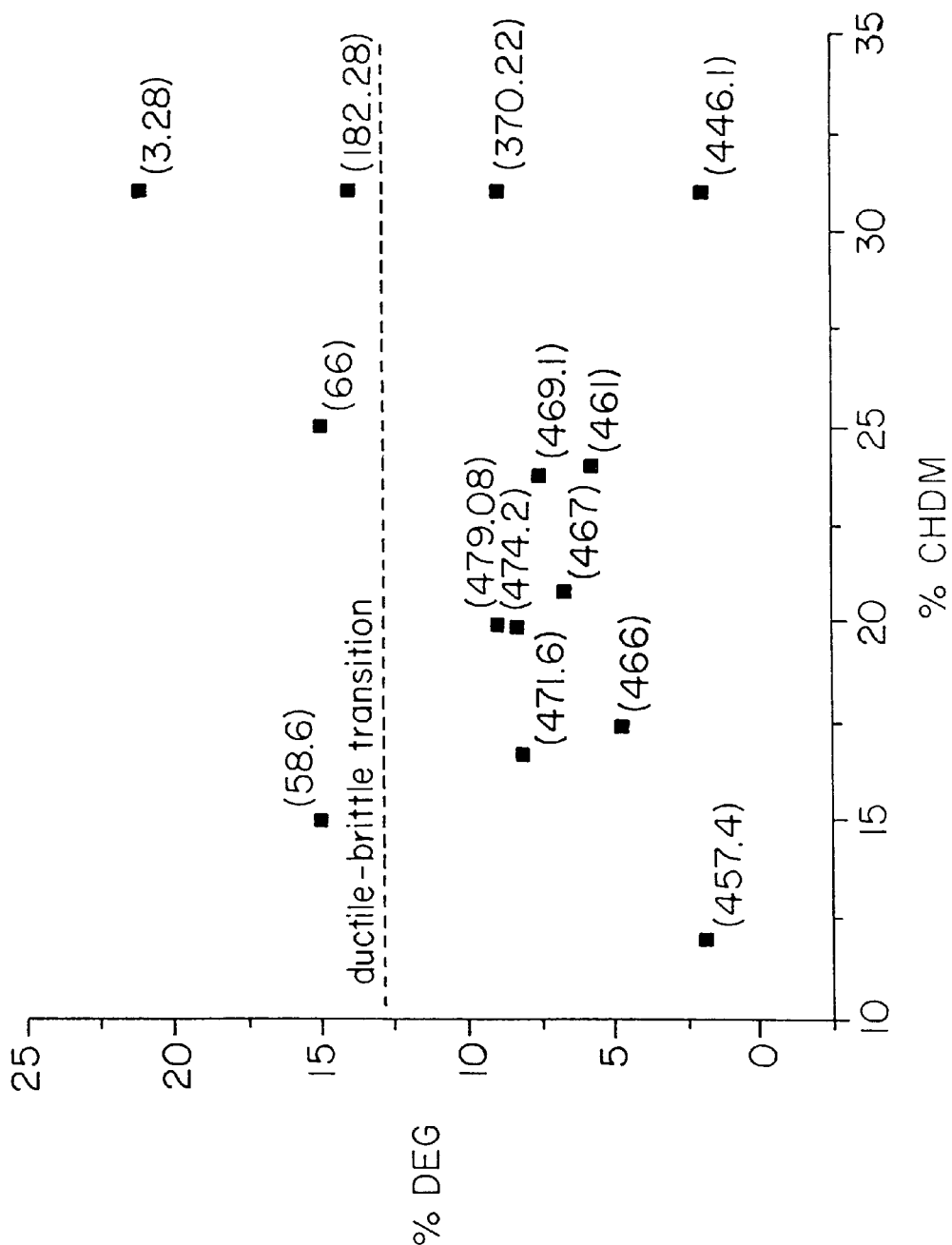
FIG. 3 is a graph showing elongation at break in the non-stretch direction as a function of composition for reactor grade copolyester compositions of the present invention.
Figure 4:
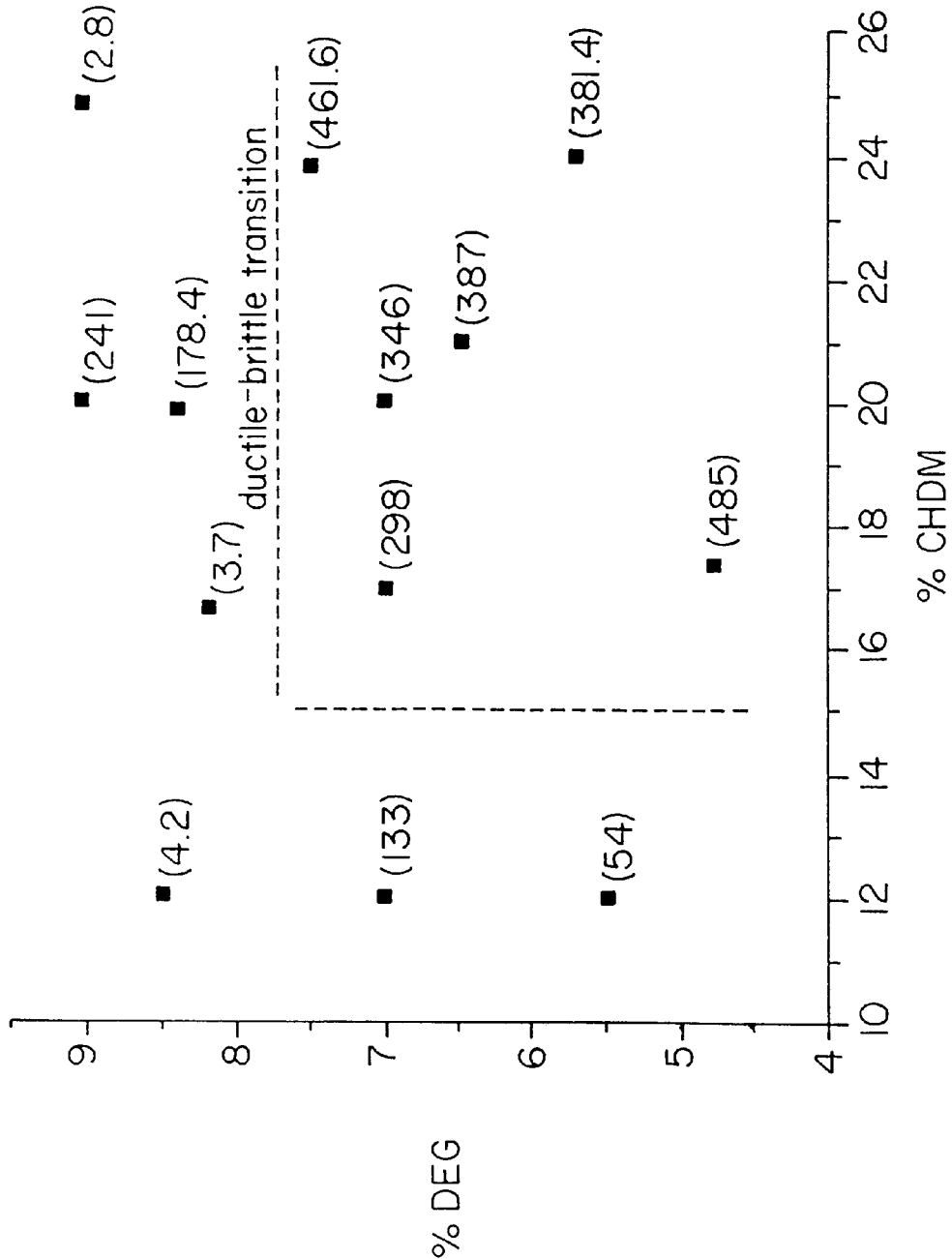
FIG. 4 is a graph showing elongation at break in the non-stretch direction as a function of composition for the blend formulations of the '116 patent.

Analysis of the data clearly indicated that a separate optimum compositional window existed for the blends and rxn-copolyesters in which each remained ductile. To visualize this window, a compositional map was created in FIGS. 3 and 4 for the rxn-copolyester and blend, respectively. The map is a plot of the mole percent DEG vs. mole percent CHDM for each composition. The number tabulated at each operating point represented the EOB for that given composition. With reference to FIG. 3, the transition from ductile to brittle film does not begin until the DEG level is above about 13 mole percent. CHDM does not appear to be a major factor. In contrast as shown in FIG. 4, this transition for the blends occurred around 7.5 mole percent. Furthermore, the CHDM level must be above about 15 mole percent in the blends to prevent brittleness.

The following compositional ranges are of significance to the preferred embodiments of the present invention:
(1) if DEG<7.5 mole % and CHDM>15 mole %, then both the blend and rxn-copolyester are ductile;
(2) if CHDM<15 mole % and DEG<13 mole % or for 7.5%<DEG<13%, then the blend is brittle but the rxn-copolyester is ductile; and
(3) if DEG>13% regardless of CHDM level, then both the blend and rxn-copolyester are brittle.

Thus, the rxn-copolyester is more ductile over a broader compositional range. This is significant since, as show in Example 6, the DEG range from 7.5% to 13% falls within a window wherein the shrink curve most closely matches PVC. This compositional window may vary slightly due to variability during processing, however, the blend is still expected to be more brittle than the rxn-copolyester for any given set of processing conditions.

Example 6
Comparison of Shrink Curves for Rxn-Copolyesters

While the material used to make a film should remain ductile when stretched, the shrink properties should also be optimized. In particular, the shrink curve of the rxn-copolyester should match that of PVC shrink film as closely as possible. To determine whether a match existed, some of the rxn-copolyesters in Table 3 were extruded and stretched on a commercial tenter frame. Samples of these stretched films were then tested to determine shrinkability as a function of temperature. Strips were cut and then immersed in a water bath, which was set at different temperatures, for 30 seconds. The samples were then removed and the % shrinkage recorded.

Plotting this 30-second shrinkage versus temperature provided a "shrink curve" for the rxn-copolyester. These shrink curves were plotted in FIG. 5 (see Table 5 below for Ref. # in FIG. 5), along with the shrink curve of a commercial PVC shrink film to make a comparison. As with PVC, an ideal shrink curve started at a low temperature and gradually increased in a controlled manner with increasing temperature. Sample 4a appeared to be the closest match of the rxn-copolyesters tested, at least by visual inspection.

In order to numerically gauge the best composition to match PVC, a type of error function was determined that increased the more the given rxn-copolyester shrink curve strayed from the PVC curve. This "error function" was the sum of the square of the error at each temperature, $$\text{error} = \sum_n [\% \ shrink_{PVC}(T_n) - \% \ shrink_{rxn-coply}(T_n)]^2$$

wherein the sum is over the n temperatures tested. The minimum value the error could achieve was zero, which implied a perfect match of the copolyester shrink curve to PVC. Values for the error were tabulated in Table 5. These errors were, in turn, curve fitted using least squares regression and found to be accurately modeled by the following equation:

$$\text{error} = 10655 - 721*(\% \ CHDM) - 169*(\% \ DEG) + 13.9*(\% \ CHDM)^2.$$

The adusted $R^2$ for this curve fit was 0.98, which indicated a good overall prediction of the error data by the equation.

To further illustrate how the error varied with composition, the above model equation was plotted in FIG. 6. Experimental shrinkage data points were also superimposed. The contours represent lines of constant "error". Ideally, a composition that falls along the error=0 contour would indicate shrinkage behavior that matches PVC. However, in reality, any composition that falls within about 500 error units from this optimum line would probably be acceptable. Note that in the upper right hand corner of FIG. 6, the contours take on negative values for the error. This is an artifact of the curve fitting as the true error term could never be less than zero.

TABLE 5

| Sample # | % DEG | % CHDM | Ref. # FIG. 5 | Shrink error (sum of square error) |
|---|---|---|---|---|
| PVC | n/a | n/a | 51 | n/a |
| 1a | 5.7 | 24 | 52 | 394 |
| 2a | 4.8 | 17.4 | 53 | 1505 |
| 3a | 8.2 | 16.7 | 54 | 1135 |
| 4a | 7.5 | 23.8 | 55 | 156 |
| 5a | 8.4 | 19.9 | 56 | 309 |
| 12a | 2 | 31 | 57 | 1319 |

The line where error=0 was determined from the model fit by setting error=0 and solving for DEG. This results in a formula for determining the optimum mole percentage of DEG with respect to CHDM in the rxn-copolyester and is as follows:

$$\% \text{ DEG(optimum)} = 63 - 4.26 * (\% \text{ CHDM}) + 0.0822 * \text{CHDM}^2.$$

This equation is used to predict the optimum DEG level for any given CHDM concentration to make the copolyester shrink curve match that of PVC. The shrink error=−500 and shrink error=500 lines are at approximately % DEG (optimum) +/−2.5%, respectively. Note that over a very broad CHDM range (i.e from about 15 to about 28 mole percent), the optimum DEG level falls within 7.5 to 13 mole percent, which corresponds to the range that the rxn-copolyester is more ductile than the blend (see previous Example). Thus, in order to have good shrink characteristics in addition to ductility, the rxn-copolyester composition is the preferred choice over the blend.

Example 7
Improved Drying

The drying conditions for various polymers are listed in Table 6. The dew point of the air is −40° F. (−40° C.) and flow rate is 1 ft³/min per lb/hr (62.37 L/min per kg/hr) of material. As seen in Table 6, drying EASTAR PETG Copolyester 6763 and the rxn-copolyester to the recommended moisture level of 0.08% requires 6 hours. Crystalline PET dries much quicker at 4 hours since the air temperature can be much higher, which makes the diffusion of water molecules out the polymer pellets much faster. However, drying EASTOBOND Copolyester 19411, an amorphous copolyester, takes at least 13 hours to achieve the same level. The mobility of water molecules at 110° F. (43.3° C.) is not great resulting in a longer drying time of 13 hours. Obviously, the drying of the DEG modified PET copolyester is a bottleneck for extruding the PETG copolyester/DEG modified PET copolyester blend.

The rxn-copolyester of the present invention provides an acceptable replacement for the '116 blends. The advantage of using the rxn-copolyester is not just eliminating the difficulty in handling multiple materials elaborated earlier, but in fact eliminating the difficulty in drying amorphous EASTOBOND Copolyester 19411.

TABLE 6

| Property | EASTAR PETG 6763 | Rxn-copolyester | EASTOBOND 19411 | PET |
|---|---|---|---|---|
| Temp, ° F. | 150 | 150 | 110 | 300 |
| (° C.) | (66) | (66) | (43) | (149) |
| Time, hr | 6 | 6 | 13 | 4 |
| Moisture, % | 0.08 | 0.08 | 0.08 | 0.005 |

Example 8
b* Color Value

The b* color value was measured using a CIELAB color scale with the following parameters: 1) D65 Illuminant, 2) 10 degree observer, 3) specular included and 4) large area view. The b* color value measures yellowness when plus and blueness when minus. The device used to measure b* color value was a HunterLab Ultrascan Colorimeter available from Hunter Associates Laboratory.

The b* color value is affected by sample form (i.e. pellet size and shape). Conventional pellets of the rxn-copolyester were placed in a glass sample holder having a thickness of 2 cm with a black background. The color measurement was by reflectance. The pellets were approximately 2–3 mm in diameter, 2–3 mm in length and weigh 0.8 gms/50 pellets.

Table 7 shows the b* color value comparison by altering the catalyst compositions (ppm) and red and blue toner compositions (ppm) of the rxn-copolyester having a composition of 100 mole percent terephthalic acid, 25 mole percent 1,4-cyclohexanedimethanol, 7 mole percent diethylene glycol, and 68 mole percent ethylene glycol.

TABLE 7

| Sample | Titanium ppm | Manganese ppm | Phosphorus ppm | Red ppm | Blue ppm | b* |
|---|---|---|---|---|---|---|
| 14 | 16 | 46 | 40 | 1 | 1.5 | 2.5 |
| 15 | 16 | 46 | 50 | 1 | 1.5 | 0.5 |

We claim:
1. A reactor grade copolyester composition comprising a diacid component comprising residues of at least about 90 mole percent terephthalic acid and a diol component comprising residues of about 59 to about 77.5 mole percent ethylene glycol, about 15 to about 28 mole percent 1,4-cyclohexanedimethanol (CHDM), and about 7.5 to about 13 mole percent diethylene glycol (DEG); wherein the diacid component is based on 100 mole percent and the diol component is based on 100 mole percent.

2. The copolyester composition of claim 1 wherein the diol component comprises 16 to 26 mole percent 1,4-cyclohexanedimethanol.

3. The copolyester composition of claim 2 wherein the diol component comprises residues of diethylene glycol within +/−2.5 mole percent of the formula:

$$\% \text{ DEG(optimum)} = 63 - 4.26 * (\% \text{ CHDM}) + 0.0822 * \text{CHDM}^2.$$

4. The copolyester composition of claim 1 having an elongation at break in a non-stretch direction as measured according to ASTM D882 for a nominally 2 mil (50 microns) thick film of at least about 300 percent.

5. The copolyester composition of claim 4 wherein the elongation at break is at least about 400 percent.

6. A heat-shrinkable film comprising the copolyester composition of claim 1.

7. A heat-shrinkable film comprising the copolyester composition of claim 3.

8. A film prepared by calendering the copolyester composition of claim 1.

9. A heat-shrinkable film comprising a reactor grade copolyester composition comprising a diacid component comprising residues of at least about 90 mole percent terephthalic acid and a diol component comprising residues of about 59 to about 77.5 mole percent ethylene glycol, about 15 to about 28 mole percent 1,4-cyclohexanedimethanol, and about 7.5 to about 13 mole percent diethylene glycol; wherein the diacid component is based on 100 mole percent and the diol component is based on 100 mole percent.

10. The heat-shrinkable film of claim 9 having an elongation at break in a non-stretch direction as measured according to ASTM D882 for a nominally 2 mil (50 microns) thick film of at least about 300 percent.

11. The heat-shrinkable film of claim 10 wherein the elongation at break is at least about 400 percent.

12. The heat-shrinkable film of claim 9 wherein the diol component comprises 16 to 26 mole percent 1,4-cyclohexanedimethanol.

13. The heat-shrinkable film of claim 12 wherein the diol component comprises residues of diethylene glycol within +/−2.5 mole percent of the formula:

$$\% \text{ DEG(optimum)} = 63 - 4.26*(\% \text{ CHDM}) + 0.0822*\text{CHDM}^2.$$

14. The heat-shrinkable film of claim 9 having a b* color value of −1.0 to less than 4.5.

15. The heat-shrinkable film of claim 14 wherein the b* color value is −1.0 to 3.5.

16. The heat shrinkable film of claim 14 wherein the reactor grade copolyester composition further comprises residues of a catalyst system comprising 0 to 75 ppm manganese, 10 to 100 ppm titanium and 25 to 150 ppm phosphorus and residues of an organic toner system comprising 1.0 to 10.0 ppm red compound of anthraquinones and 1.0 to 10.0 ppm blue compound of substituted 1,4-bis (2,6-dialylanilino) anthraquinones, wherein the amount of residues of the catalyst system and the organic toner system is based on the weight of the copolyester.

17. The heat-shrinkable film of claim 16 wherein the catalyst system comprises 15 to 50 ppm titanium, 20 to 60 ppm manganese and 25 to 150 ppm phosphorus and the organic toner system comprises 1.0 to 5.0 ppm red compound of anthraquinones and 1.0 to 5.0 ppm blue compound of substituted 1,4-bis(2,6-dialylanilino) anthraquinones.

18. A heat-shrinkable film comprising a reactor grade copolyester composition comprising a diacid component comprising residues of at least about 90 mole percent terephthalic acid and a diol component comprising residues of about 61 to about 82 mole percent ethylene glycol, about 16 to about 26 mole percent 1,4-cyclohexanedimethanol, and about 2 to about 13 mole percent diethylene glycol within +/−2.5 mole percent of the formula:

$$\% \text{ DEG(optimum)} = 63 - 4.26*(\% \text{ CHDM}) + 0.0822*\text{CHDM}^2.$$

19. The copolyester composition of claim 18 wherein the diacid component comprises residues of at least 95 mole percent terephthalic acid.

20. The copolyester composition of claim 19 wherein the diacid component comprises residues of 100 mole percent terephthalic acid.

21. The copolyester composition of claim 18 wherein the diol component comprises residues of about 7.5 to about 13 mole percent diethylene glycol.

* * * * *